(12) United States Patent
Clee et al.

(10) Patent No.: US 8,001,341 B2
(45) Date of Patent: Aug. 16, 2011

(54) MANAGING DYNAMICALLY ALLOCATED MEMORY IN A COMPUTER SYSTEM

(75) Inventors: Scott Clee, Winchester (GB); Paul Cooper, Eastleigh (GB); Thomas D. Grieve, Romsey (GB); Margaret E. Fisher, Tadley (GB)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 12/018,616

(22) Filed: Jan. 23, 2008

(65) Prior Publication Data
US 2009/0187614 A1 Jul. 23, 2009

(51) Int. Cl.
*G06F 12/02* (2006.01)
(52) U.S. Cl. ......... 711/159; 711/170; 711/171; 718/104
(58) Field of Classification Search .................. 711/159, 711/170, 171; 718/104
See application file for complete search history.

(56) References Cited

U.S. PATENT DOCUMENTS

| | | | |
|---|---|---|---|
| 6,298,370 B1 * | 10/2001 | Tang et al. | 718/102 |
| 6,865,657 B1 | 3/2005 | Traversat et al. | |
| 7,636,827 B2 * | 12/2009 | Asano et al. | 711/165 |
| 2007/0277018 A1 * | 11/2007 | Tanaka | 711/171 |

* cited by examiner

*Primary Examiner* — Jae U Yu
(74) *Attorney, Agent, or Firm* — Yee & Associates, P.C.; David A. Mims, Jr.

(57) ABSTRACT

Managing dynamically allocated memory in a computer system in which garbage collection process is scheduled separately from data processing comprises initiating a system program and providing system memory for use by the system program, the system program being arranged to provide a processing environment, initiating an application program within the processing environment for performing one or more units of processing, allocating a portion of the memory for use by the application program for performing the processing, providing a first unit of processing to the application program, determining the proportion of the provided system memory in use on completion of processing of the first unit; and if the proportion exceeds a predetermined threshold, providing a memory recovery instruction to the system program to identify elements in the system memory occupied by objects or data inaccessible to the application program and to free the elements of the provided system memory.

19 Claims, 4 Drawing Sheets

US 8,001,341 B2

MANAGING DYNAMICALLY ALLOCATED MEMORY IN A COMPUTER SYSTEM

FIELD OF INVENTION

The present invention relates to a method, apparatus or computer program product for managing dynamically allocated memory in a computer system.

BACKGROUND OF THE INVENTION

In computer systems, application programs use system memory in order to perform their processing. In some systems, the required system memory is dynamically allocated, that is, the memory is allocated during the runtime of the application program, usually as the application program starts up or initialises its processing. The allocated memory is then used to store data associated with the application program in a predetermined type of data structure such as a heap. In such dynamic memory allocation arrangements, a maintenance process is commonly employed periodically to identify any memory elements in the allocated memory, such as objects or data, which are inaccessible to the application program. The maintenance process is arranged to free such identified elements for subsequent use by the application program. Such maintenance processes are commonly referred to as garbage collection processes.

One problem with using garbage collection processes, particularly where the performance of the corresponding application program is critical, is that the processing resource required by the garbage collection process is detrimental to the overall processing performance of the application program.

SUMMARY OF THE INVENTION

An embodiment of the invention provides a method for managing dynamically allocated memory in a computer system, the method comprising the steps of:

initiating a system program on a computer system and providing system memory for use by the system program, the system program being arranged to provide a processing environment;

initiating an application program within the processing environment for performing one or more units of processing;

allocating a portion of the memory for use by the application program for performing the processing;

providing a first unit of processing to the application program for processing;

determining the proportion of the provided system memory in use on completion of processing of the first unit of processing; and if the proportion exceeds a predetermined threshold, providing a memory recovery instruction to the system program arranged to identify elements in the provided system memory that are occupied by objects or data that are inaccessible to the application program and to free the elements of the provided system memory for further use.

The memory recovery instruction may comprise a garbage collection instruction. The system program may comprise a system virtual machine. The system program may comprise an application virtual machine. The application program may be run in the processing environment within a wrapper program, the wrapper being arranged to determine the proportion of the provided system memory in use on completion of processing of a given unit of processing. The memory recovery instruction may be scheduled for processing by the system program when the application program is idle. The predetermined threshold may be user defined. The provided system memory comprises a data structure. The data structure may be a heap.

The computer system may comprise a plurality of the system programs arranged to process a plurality of units of processing under the coordinating control of a management program, the management program being arranged to provide the units of work for respective application programs and to schedule respective memory recovery instructions to respective system programs. The computer system may be arranged to provide a transactional data processing system and the units of processing may comprise transactions. The memory recovery instruction may be scheduled as a transaction by the transactional data processing system.

Another embodiment provides apparatus for managing dynamically allocated memory in a computer system, the apparatus being operable to:

initiate a system program on a computer system and providing system memory for use by the system program, the system program being arranged to provide a processing environment;

initiate an application program within the processing environment for performing one or more units of processing;

allocate a portion of the memory for use by the application program for performing the processing;

provide a first unit of processing to the application program for processing;

determine the proportion of the provided system memory in use on completion of processing of the first unit of processing; and if the proportion exceeds a predetermined threshold, provide a memory recovery instruction to the system program arranged to identify elements in the provided system memory that are occupied by objects or data that are inaccessible to the application program and to free the elements of the provided system memory for further use.

A further embodiment provides a group of one or more programs arranged to enable a group of one or more programmable devices to perform a method for managing dynamically allocated memory in a computer system, the method comprising the steps of:

initiating a system program on a computer system and providing system memory for use by the system program, the system program being arranged to provide a processing environment;

initiating an application program within the processing environment for performing one or more units of processing;

allocating a portion of the memory for use by the application program for performing the processing;

providing a first unit of processing to the application program for processing;

determining the proportion of the provided system memory in use on completion of processing of the first unit of processing; and if the proportion exceeds a predetermined threshold, providing a memory recovery instruction to the system program arranged to identify elements in the provided system memory that are occupied by objects or data that are inaccessible to the application program and to free the elements of the provided system memory for further use.

Another embodiment provides a group of one or more programs arranged to enable a group of one or more programmable devices to provide apparatus for managing dynamically allocated memory in a computer system, the apparatus being operable to:

initiate a system program on a computer system and providing system memory for use by the system program, the system program being arranged to provide a processing environment;

initiate an application program within the processing environment for performing one or more units of processing;

allocate a portion of the memory for use by the application program for performing the processing;

provide a first unit of processing to the application program for processing;

determine the proportion of the provided system memory in use on completion of processing of the first unit of processing; and if the proportion exceeds a predetermined threshold, provide a memory recovery instruction to the system program arranged to identify elements in the provided system memory that are occupied by objects or data that are inaccessible to the application program and to free the elements of the provided system memory for further use.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS OF THE INVENTION

Figure 1:
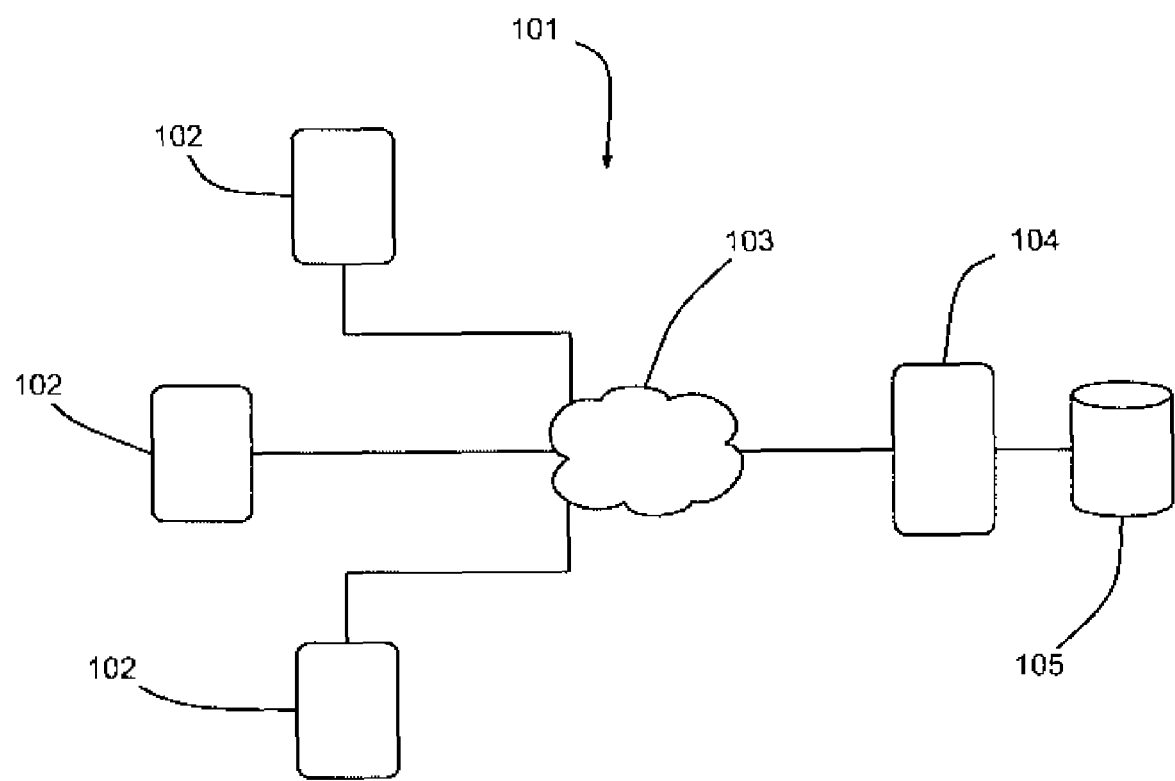
FIG. 1 is a schematic illustration of an exemplary data processing system.

With reference to FIG. 1, a computer network 101 comprises a set of client computers 102 interconnected via a network 103, such as a wide area network (WAN), to a server computer 104. The server computer 104 is further connected to storage device 105. The server computer 104 is arranged to provide a computer system in the form of a transaction server application program (TS). The TS is arranged to provide transactional data processing services to users of the client computers 102 via client application programs provided on the respective client computers 102. The transaction server application program (TS) is arranged to use the storage device 105 for the storage of its associated data.

Figure 2:
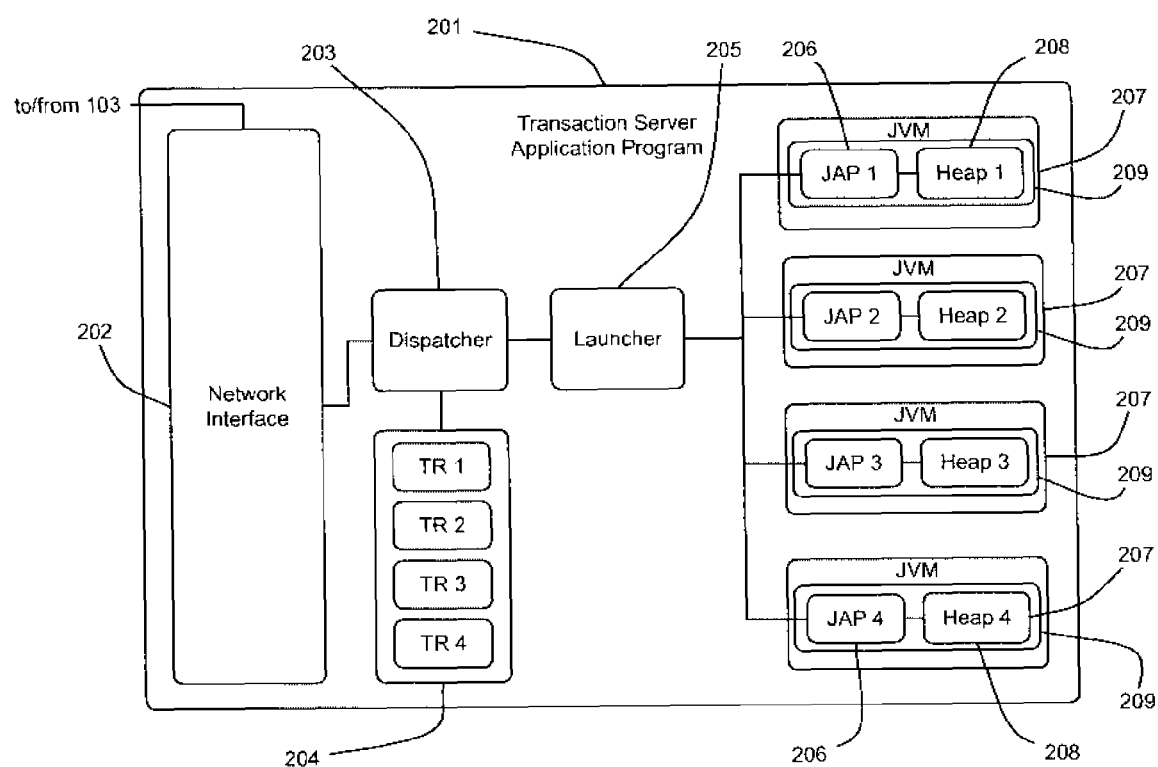
FIG. 2 is a schematic illustration of an exemplary transaction server application program in the system of FIG. 1.

FIG. 2 shows partial detail exemplary of the architecture of the transaction server application program (TS) 201, which comprises a network interface 202 connecting the TS 201 to the network 103. The network interface is arranged to manage data processing requests from the client computers 102 and to pass the data processing tasks from each such request to a dispatcher 203. The dispatcher 203 is arranged to assign each data processing task to an appropriate transaction and to maintain a queue 204 of such transactions. The dispatcher 203 is arranged to pass transactions from the queue 204 to a launcher 205. In other words, the dispatcher 203 comprises a transactional management program. In the present exemplary embodiment, each transaction is processed by a Java™ application program (JAP) 206 running in a processing environment provided by a system program in the from a Java™ virtual machine (JVM) 207. FIG. 2 illustrates four JVMs 207 (JVM 1, JVM 2, JVM 3, JVM 4) each running a respective JAP 206 (JAP 1, JAP 2, JAP 3, JAP 4) for processing respective transactions from the queue 204. The launcher 205 is arranged to initiate the processing of each respective transaction by an appropriate JAP 206 within an associated JVM 207.

When each JAP 206 is initiated within a corresponding JVM 207, a portion of the JVM memory, in the form of a heap 208, is dynamically allocated for the respective JAP 206. The TS 201 is arranged to process multiple transactions in parallel, each transaction being processed by a respective JAPs 206 running on respective JVMs 207. In other words, each JVM 207 is single threaded and arranged to run a single JAP 206 for processing a series of transactions. As each respective JAP 206 completes its processing of a given transaction, the dispatcher 203 is arranged to provide a further applicable transaction from the queue for processing by the given JAP 206. As transactions are processed by a given JVM 207, the respective heap 208 may become full and the JAP 206 may not be able to create further objects in the heap 208. In the present embodiment, the state of the heap 208 is monitored and when the amount of used space exceeds a predetermined threshold, a memory recovery process is initiated, in the form of a garbage collection (GC) process, during which all unused objects in the heap 208 are cleared to free up memory space.

In the present embodiment, the mechanism used to monitor the state of the heap of each JVM 207 is in the form of a wrapper 209. The launcher 205 is arranged to initiate a wrapper 209 on a respective JVM 207 and the wrapper 209 in arranged, in turn, to invoke the relevant JAP 206 for a given transaction. Thus each JAP 206 runs within a wrapper 209 on a respective JVM 207. The wrappers 209 are arranged to report the state of the heap 208 for a respective JVM 207 to the launcher 205 after the completion of the processing of a given transaction. While a given JVM is generally capable of determining the state of its heap, until a storage request is made by a relevant JAP that cannot immediately be satisfied by the JVM, the JVM is not itself capable of determining how close it is to running out of storage and thus having to perform a GC process. The wrappers 209 thereby enable data on the state of the heap 208 for the JVMs 207 to be provided to an external controller, in the form of the launcher 205, so as to enable external control of garbage collection for the JVMs 207, which is otherwise an internal JVM process.

In the present exemplary embodiment, the state of the heap for a given JVM 207 is represented by the percentage of the heap that is full at the end of the processing of the last JAP 206. The launcher 205 is arranged to compare the state of the heap provided by a given wrapper 209 to a user definable threshold value of 85%. If the threshold is met or exceed, the launcher 205 is arranged to issue a request to the dispatcher 203 to schedule a new transaction comprising a system program (JVM), garbage collection (GC) instruction. The GC transaction is specifically assigned to the JVM 207 for which a full heap has been reported. The GC transaction is arranged to start asynchronously and to run on the relevant JVM 207 after the reporting transaction has finished its processing. Usually, the GC transaction will be the next program to run in the relevant JVM 207. However, in a particularly busy TS 201, another user transaction may start before it, in which case the GC transaction waits until the user transaction ends.

Figure 3:
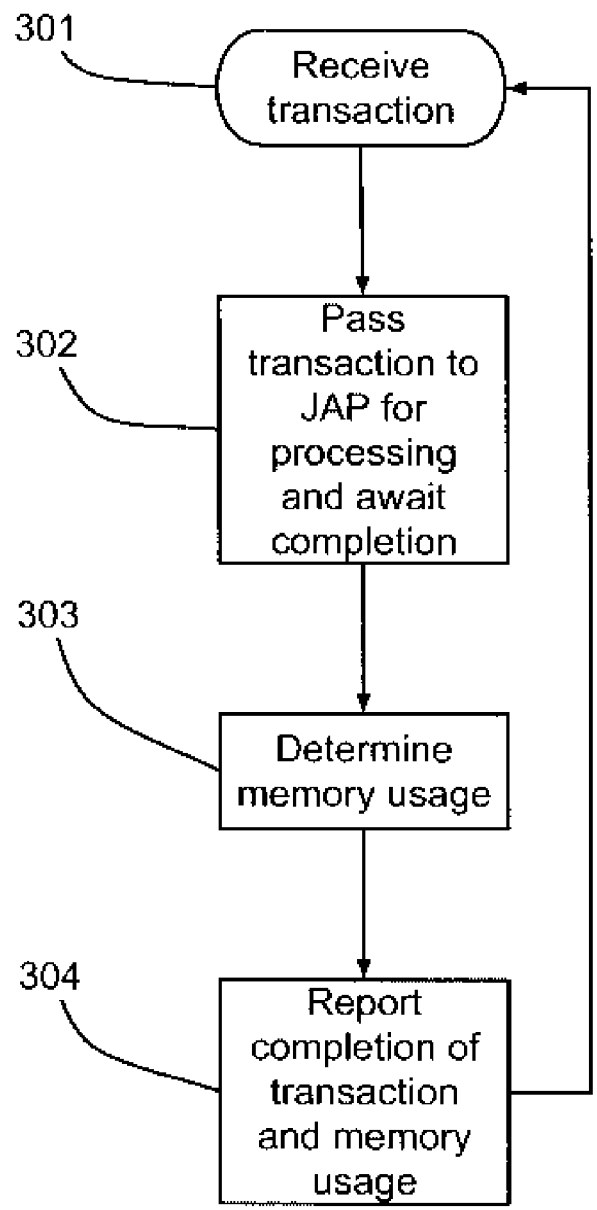
FIGS. 3 and 4 are flow charts illustrating exemplary processing performed in the transaction server application program of FIG. 2.

The processing performed by the wrapper 209 when monitoring and reporting the state of the allocated memory 208 for a given JVM 207 will now be described in further detail with reference to the flow chart of FIG. 3. At step 301, the wrapper 209 receives a transaction for processing from the launcher 205 and processing moves to step 302. At step 302, the transaction is passed to the relevant JAP 206 and its processing begins. The wrapper then waits for completion of the transaction processing and, once complete, processing moves to step 303. At step 303, the percentage of the heap 207 in use on completion of processing of the transaction is calculated and processing moves to step 304. At step 304, the completion of the processing of the transaction, including any results and the state of the heap 207 is reported to the launcher 205. Processing then returns to step 301 to begin processing the next transaction received from the launcher 205.

Figure 4:
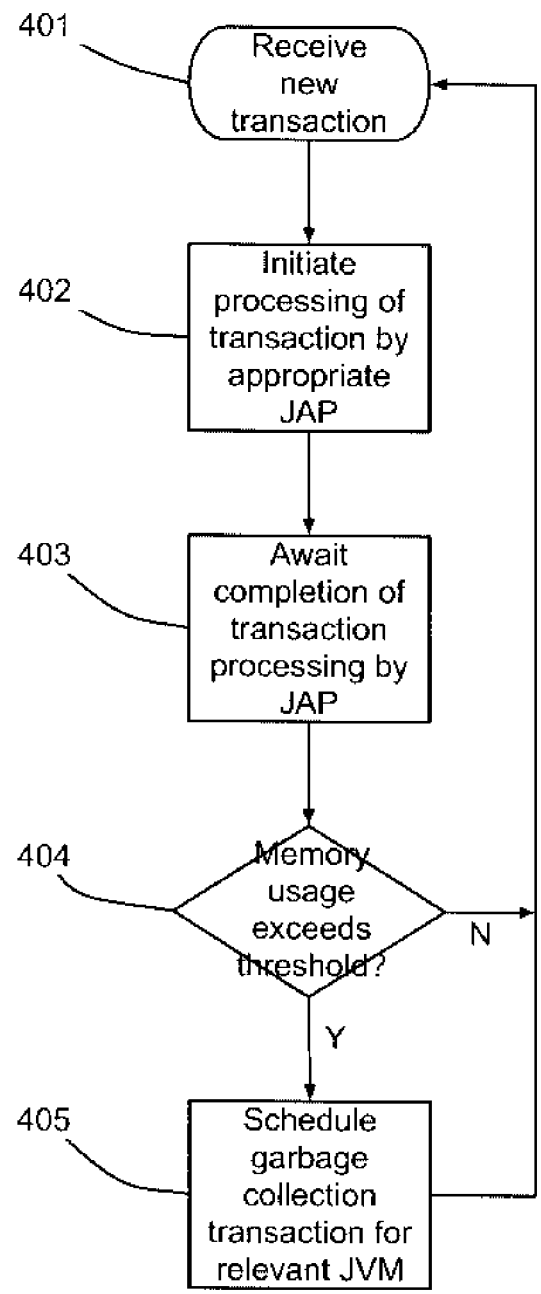

The processing performed by the launcher 205 when receiving a report on the state of the allocated memory 208 for a given JVM 207 will now be described further with reference to the flow chart of FIG. 4. At step 401, a new transaction is received from the dispatcher 203 and processing moves to step 402. At step 402, processing of the transaction by the appropriate JAP 206 is initiated via the associated wrapper 209 on the relevant JVM 207. Processing then moves to step 403 and awaits completion of processing of the transaction by the selected JAP 206. In the present embodiment, the launcher 205 is arranged to handle multiple transactions at any given time. When completion of the transaction is reported, processing moves to step 404 where the reported heap usage is compared to the predetermined threshold. If the reported usage is below the threshold then processing returns to step 401 to begin processing of the next transaction supplied by the dispatcher 203. If the reported usage meets or exceeds the predetermined threshold, processing moves to step 406. At step 406, a request is sent to the dispatcher 203 to schedule a garbage collection (GC) transaction for the relevant JVM 207. Processing then returns to step 401 to begin processing of the next transaction supplied by the dispatcher 203.

As will be understood by those skilled in the art, a GC transaction may not get processed by the relevant JVM 207 before its heap 208 becomes full. As a result, a standard GC process will be initiated within the processing of a standard transaction as a result of the resident JAP 206 not being able to create further objects. If this situation occurs regularly it may indicate that the heap usage threshold is set too high or that the heap is too small. Scheduling a GC in a separate transaction is arranged to normally remove the GC overhead from standard or application transactions. As will be understood by those skilled in the art, checks and locks are provided to ensure that a GC transaction does not run simultaneously with a standard transaction, and also that multiple GC transactions are not scheduled for the same JVM.

In another embodiment, no further application transactions are sent to a given JVM until a scheduled GC process has been performed. In a further embodiment, the data processing system is non-transactional. When the state of a heap for a given application exceeds the usage threshold a GC process is scheduled for subsequent processing by the JVM. The GC process may be scheduled for periods of inactivity of the application or of the virtual machine (VM) or processor on which the application is running. As will be understood by those skilled in the art, embodiments of the invention may be applied to data processing systems that make use of single or multiple processors, which may be capable of parallel or multithreaded processing. Furthermore, embodiments of the invention may be applied to data processing system that make use of real machines in place of VMs or which make use of any suitable form of application VM such as process VMs or application VMs.

In the embodiments described above, the term "system program" is used to refer to a program that provides a processing environment for an application program, that is, a VM. VMs, including JVMs may be categorised as system programs, as in the present embodiments, and may also be referred to as application programs.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device.

The medium can be an electronic, magnetic, optical, electromagnetic, infrared, or semiconductor system, (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description but is not intended to exhaust or limit the invention in the form disclosed. Many modifications and variations will be apparent to those of ordinary skill in the art. The embodiments were chosen and described in order to best explain the principles of the invention and the practical application, and to enable others of ordinary skill in the art to understand the invention for various embodiments with various modifications as are suited to the particular use contemplated.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method for managing dynamically allocated memory in a computer system, said method comprising:
    initiating a system program on the computer system and providing system memory for use by said system program, said system program being arranged to provide a processing environment;
    initiating an application program within said processing environment for performing one or more units of processing;
    allocating a portion of said system memory for use by said application program for performing said processing;
    providing a first unit of processing to said application program for processing;
    determining a proportion of said provided system memory in use on completion of processing of said first unit of processing; and
    in response to said proportion exceeding a predetermined threshold, providing a memory recovery instruction to said system program arranged to identify elements in said provided system memory that are occupied by objects or data that are inaccessible to said application program and to free said elements of said provided system memory for further use, wherein said computer system comprises a plurality of instances of said system program arranged to process a plurality of units of processing under the coordinating control of a management program, said management program being arranged to provide said units of processing for respective application programs and to schedule respective memory recovery instructions to respective system programs.

2. The method according to claim 1 in which said memory recovery instruction comprises a garbage collection instruction.

3. The method according to claim 1 in which said system program comprises a system virtual machine.

4. The method according to claim 1 in which said system program comprises an application virtual machine.

5. The method according to claim 1 in which said application program is run in said processing environment within a wrapper program, said wrapper program being arranged to determine said proportion of said provided system memory in use on completion of processing of a given unit of processing.

6. The method according to claim 1 in which said memory recovery instruction is scheduled for processing by said system program when said application program is idle.

7. The method according to claim 1 in which said predetermined threshold is user defined.

8. The method according to claim 1 in which said provided memory comprises a data structure.

9. The method according to claim 8 in which said data structure is a heap.

10. The method according to claim 1 in which said computer system is arranged to provide a transactional data processing system and said units of processing comprise transactions.

11. The method according to claim 10 in which said memory recovery instruction is scheduled as a transaction by said transactional data processing system.

12. An apparatus for managing dynamically allocated memory in a computer system, said apparatus being operable to:
    initiate a system program on the computer system and providing system memory for use by said system program, said system program being arranged to provide a processing environment;
    initiate an application program within said processing environment for performing one or more units of processing;
    allocate a portion of said system memory for use by said application program for performing said processing;
    provide a first unit of processing to said application program for processing;
    determine a proportion of said provided system memory in use on completion of processing of said first unit of processing; and
    in response to said proportion exceeding a predetermined threshold, provide a memory recovery instruction to said system program arranged to identify elements in said provided system memory that are occupied by objects or data that are inaccessible to said application program and to free said elements of said provided system memory for further use, wherein said computer system comprises a plurality of instances of said system program arranged to process a plurality of units of processing under a coordinating control of a management program, said management program being arranged to provide said units of processing for respective application programs and to schedule respective memory recovery instructions to respective system programs.

13. The apparatus according to claim 12 in which said memory recovery instruction comprises a garbage collection instruction.

14. The apparatus according to claim 12 in which said system program comprises a system virtual machine.

15. The apparatus according to claim 12 in which said system program comprises an application virtual machine.

16. The apparatus according to claim 12 in which said application program is run in said processing environment within a wrapper program, said wrapper being arranged to determine said proportion of said provided system memory in use on completion of processing of a given unit of processing.

17. The apparatus according to claim 12 in which said memory recovery instruction is scheduled for processing by said system program when said application program is idle.

18. The apparatus according to claim 12 in which said predetermined threshold is user defined.

19. A computer readable storage medium having a computer readable program, wherein the computer readable program when executed on a computer causes the computer to perform a method for managing dynamically allocated memory in a computer system, said method comprising:
    initiating a system program on the computer system and providing system memory for use by said system program, said system program being arranged to provide a processing environment;
    initiating an application program within said processing environment for performing one or more units of processing;
    allocating a portion of said system memory for use by said application program for performing said processing;
    providing a first unit of processing to said application program for processing;
    determining a proportion of said provided system memory in use on completion of processing of said first unit of processing; and in response to said proportion exceeding a predetermined threshold, providing a memory recovery instruction to said system program arranged to identify elements in said provided system memory that are occupied by objects or data that are inaccessible to said application program and to free said elements of said provided system memory for further use, wherein said computer system comprises a plurality of instances of said system program arranged to process a plurality of units of processing under a coordinating control of a management program, said management program being arranged to provide said units of processing for respective application programs and to schedule respective memory recovery instructions to respective system programs.

* * * * *